June 8, 1965  C. M. ZERR  3,187,466
TENSIONING UNIT
Filed April 13, 1961
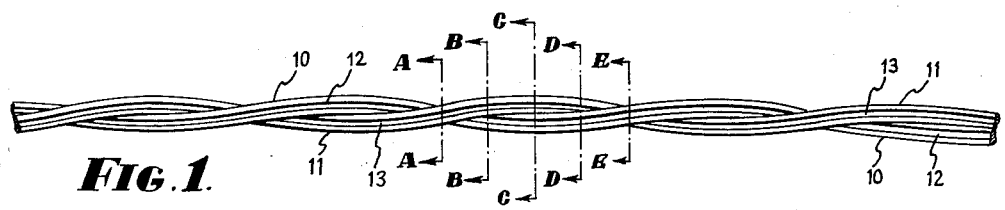
FIG. 1.
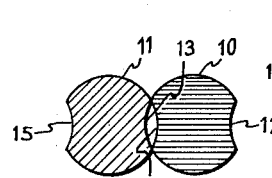
FIG. 1A.
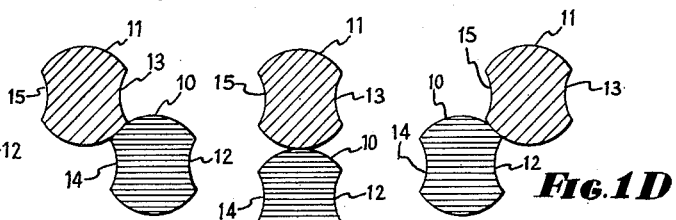
FIG. 1B.   FIG. 1C.   FIG. 1D.
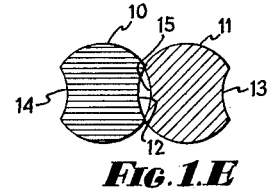
FIG. 1E.
FIG. 3.
FIG. 4.
FIG. 5.
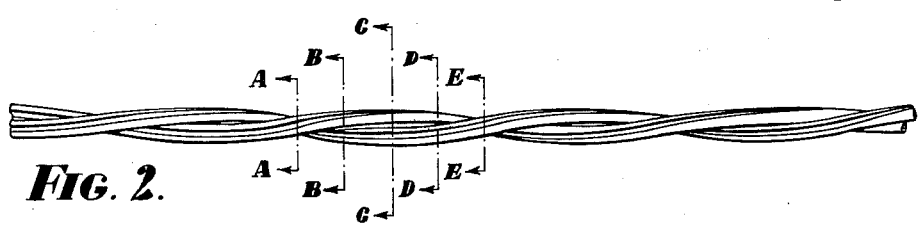
FIG. 2.
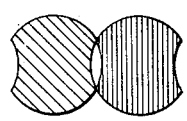
FIG. 2A.
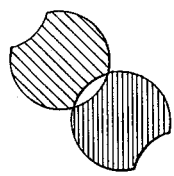
FIG. 2B.
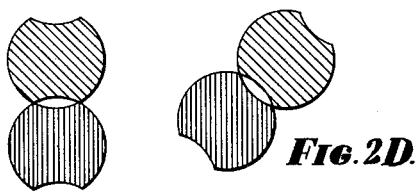
FIG. 2C.   FIG. 2D.
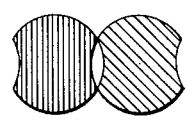
FIG. 2E.
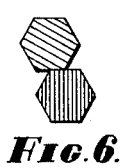
FIG. 6.
FIG. 7.
INVENTOR.
CHARLES M. ZERR,
BY
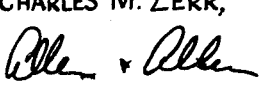
ATTORNEYS.

United States Patent Office 3,187,466
Patented June 8, 1965

3,187,466
TENSIONING UNIT
Charles M. Zerr, Independence, Mo., assignor to Armco Steel Corporation, Middletown, Ohio, a corporation of Ohio
Filed Apr. 13, 1961, Ser. No. 102,846
3 Claims. (Cl. 50—522)

This invention relates to a tensioning unit and more particularly to a tensioning unit designed to be cast into a structural member of concrete or other material having good compressive strength qualities, but poor qualities when subjected to tensional stresses. Typical of the materials which have very good compressive strength and poor tensile strength is Portland cement or concrete comprising Portland cement and an aggregate. Thus, structural columns of concrete are very satisfactory, but beam members and floor or roof slabs, which are subjected to flexural loads and which produce tensile stresses in the lower areas of such slabs or beams, require the incorporation into the concrete of reinforcing members.

Reinforcing steel has commonly been embedded in concrete structural members for a great many years. In recent times, there has been developed what has come to be known as prestressed concrete, wherein a steel rod or wire or a composite of several steel rods or wires is placed in a mold in which such structural element is to be cast and subjected to tension prior to the casting of the concrete in the mold. The chemistry and physical properties of prestressing wire and rod are set forth in accepted ASTM specifications. Tension is maintained until the concrete has completely set and then when the tension is released on the tensioning elements, they tend to revert to their initial condition, thereby placing the concrete structural member under compression.

In order for such tensioning unit to serve its function efficiently, means must be provided for a good bond between the tensioning member and the concrete. In the past, attempts have been made to accomplish this by the provision of transverse discs or plates at spaced intervals and at the ends of the concrete unit, but such tensioning units are expensive to make and have not, in general, proved entirely satisfactory.

With the foregoing considerations in mind, it is an object of the present invention to provide a tensioning unit which will fulfill the requirements above outlined in that it is so configured that a good bond will be provided with the concrete which is cast about it. It is a further object of the invention to provide a tensioning unit as above outlined which will be inexpensive to manufacture and which can be manufactured on conventional wire stranders, such as are used in the production of wire rope.

These and other objects of the invention, which will be pointed out more in detail hereinafter or which will be apparent to one skilled in the art upon reading these specifications, I accomplish by that certain construction and arrangement of parts of which I shall now describe an exemplary embodiment.

Reference is made to the drawing forming a part hereof and in which:

FIGURE 1 is an elevation view of a fragment of a tensioning unit according to the present invention.

FIGURES 1A to 1E are respectively enlarged cross-sectional views taken on the lines A—A, B—B, C—C, D—D, and E—E of FIGURE 1.

FIGURE 2 is an elevational view similar to FIGURE 1 showing twisted rather than laid wires.

FIGURES 2A to 2E are respectively enlarged cross-sectional views taken on the lines A—A, B—B, C—C, D—D, and E—E of FIGURE 2.

FIGURES 3 to 7 inclusive are cross-sectional views through tensioning units similar to FIGURES 1A to 1E, but showing various non-circular or orientatable wire sections.

Briefly, in the practice of the invention, I provide a tensioning unit which is made up of two or more wires which are then laid together helically without twisting, each of the wires constituting the tensioning unit being of non-circular cross-section, i.e. of a cross-section which is subject to orientation.

Referring more particularly to FIG. 1, I have illustrated a two-wire strand composed of the identical wires 10 and 11. In the particular embodied illustration, the wires are provided with two diametrically opposite grooves. In the wire 10, there is the groove 12 and there may be a corresponding groove diametrically opposed to the groove 12. Similarly, in the wire 11, the groove 13 can be observed and the wire 11 will have another groove diametrically opposed to the groove 13.

Referring to FIGURES 1A to 1E, the cross-section of the wire can be seen more clearly. I have illustrated the wire 10 having the groove 12 and the diametrically opposed groove 14, and the wire 11 having the groove 13 and the diametrically opposed groove 15.

The important thing about the configuration of the wire is that it be non-circular or, in other words, subject to orientation. When a non-circular wire or one which is of a cross-section which can be oriented is brough together with another such wire and the two wires are laid together helically without twisting, the configuration of the wire which makes it subject to orientation will always face the same way in the two-wire or multiple wire strand and will not twist after the manner of an irregular thread. This is clearly seen in FIGURES 1A to 1E inclusive.

It will be understood that if two circular wires were twisted together or laid together without twisting and the composite strand were embedded in concrete, the composite strand could simply be pulled out of the concrete structure by what might be termed an unscrewing action. Similarly, if two wires which are subject to orientation are twisted together rather than laid without twisting, they can be "unscrewed." This clearly appears from a consideration of FIGURE 2 and FIGURES 2A to 2E inclusive. Of course, it will be realized that FIGURES 1, 1A to 1E, 2, and 2A to 2E show a highly idealized condition in that the two wires have only limited contact. Practically speaking the two wires shown would probably "nest" to some extent if the orientations were this similar.

When a plurality of strands are laid together without twisting and the individual wires are subject to orientation, this "unscrewing" can no longer be done because of the locking effect, for example, of the grooves 12, 13, 14 and 15 with respect to the concrete which enters into them when an attempt is made to twist the strand in pulling it out of the concrete. It must be understood that the phrase "without twisting" means in the direction of closing, but is not exclusive of back twisting, i.e. twisting in the opposite direction to that in which the wire is laid.

For the foregoing reasons, a very excellent locking effect between the concrete and the tensioning unit is achieved and this locking effect is far superior to anything heretofore accomplished. Furthermore, it is accomplished without the provision of plates, lateral protuberances or other gripping elements which require separate manufacturing steps to produce. The grooves of the present invention are achieved in the final wire drawing operation and, while the die is perhaps somewhat more expensive than the conventional similar die, the actual drawing operation is not thereby rendered more expensive. It will also be understood that while I have illustrated two diametrically opposed grooves, the desired effects may be achieved to a substantial degree with a single groove and, in fact, with any cross-sectional configuration which is not circular, i.e. oval, square, round cornered square, etc.

It will be understood also that while I have described in detail a two-wire strand, for some operations three or more wires will prove desirable.

The wire used may vary over a range of chemistry and heat treatment to achieve various physical properties for a multiplicity of beam loading requirements. A typical wire for my tensioning unit may include, in addition to iron, the following ingredients:

| | Percent |
|---|---|
| Carbon | .80 |
| Manganese | .70 |
| Phosphorus | .010 |
| Sulphur | .033 |
| Silicon | .20 |

As a typical example of the use of my tensioning units in floor slabs, the following example may be considered. Floor slabs are generally cast in thicknesses of 2" to 8" and widths of 4' and they are generally cast in long lengths of, say, 400'. These 400' long slabs are then sawed to the desired or required length for a particular job. By way of example, a 40" wide slab might have twenty tensioning units running the entire length of the slab. The tensioning units in such a slab might be composed of two wires each, the wires being of a diameter of .130", having the opposed grooves mentioned above, which would give such wires the same cross-sectional area as a circular wire of a diameter of approximately .120". In such a typical construction, the tensioning units would be subjected to a tension of perhaps 3,800 pounds before and during the casting of the slab. When the tension is relieved after the concrete has set, the resulting slab is prestressed in compression so that it will support a very substantially higher flexure load than would otherwise be possible. Furthermore, the bond between the tensioning unit and slab is very uniform so that the holding power per unit of length is substantially constant and every unit of length contributes its proportionate share to the total prestressing effect.

In the particular example given above, the preferred lay will have a pitch of 2".

It will be clear that numerous modifications may be made without departing from the spirit of my invention. I, therefore, do not intend any limitation other than those expressly stated in the claims.

Having now fully described the invention, what I claim as new and desire to secure by Letters Patent is:

1. A tensioning unit for prestressing concrete structural elements, said unit comprising a strand including a multiplicity of high tensile strength wires, each wire being of a non-circular cross-section subject to orientation, said wires being laid together helically, the cross-sectional configuration of each non-circular wire of said strand maintaining the same orientational relationship to the cross-sectional configuration of each of the remaining wires of said strand as well as to a single plane containing the longitudinal axis of said strand throughout the length of the strand, whereby said unit when embedded under prestressing tension in a concrete casting, will lock with respect to said casting under the influence of a force tending to unscrew said unit with respect to said casting.

2. A structure according to claim 1, wherein each of said wires includes at least one longitudinal groove.

3. A structure according to claim 1, wherein each wire includes two diametrically opposed longitudinal grooves.

References Cited by the Examiner

UNITED STATES PATENTS

| 505,664 | 9/93 | Lee | 50—522 |
| 542,206 | 7/95 | Ransome | 50—526 |
| 991,439 | 5/11 | Hall | 50—526 |
| 2,123,239 | 7/38 | Griffel | 50—526 |
| 2,216,758 | 10/40 | Schmidt | 50—526 |

FOREIGN PATENTS

| 646,708 | 11/50 | Great Britain. |
| 739,480 | 10/55 | Great Britain. |

HENRY C. SUTHERLAND, Primary Examiner.

WILLIAM I. MUSHAKE, JACOB I. NACKENOFF, Examiners.